(12) United States Patent
Tian et al.

(10) Patent No.: US 11,829,889 B2
(45) Date of Patent: Nov. 28, 2023

(54) PROCESSING METHOD AND DEVICE FOR DATA OF WELL SITE TEST BASED ON KNOWLEDGE GRAPH

(71) Applicant: Institute of Geology and Geophysics, Chinese Academy of Sciences, Beijing (CN)

(72) Inventors: Fei Tian, Beijing (CN); Qingyun Di, Beijing (CN); Wenhao Zheng, Beijing (CN); Zhongxing Wang, Beijing (CN); Yongyou Yang, Beijing (CN); Wenxiu Zhang, Beijing (CN); Renzhong Pei, Beijing (CN)

(73) Assignee: Institute of Geology and Geophysics, Chinese Academy of Sciences, Beijing (CN)

( * ) Notice: Subject to any disclaimer, the term of this patent is extended or adjusted under 35 U.S.C. 154(b) by 74 days.

(21) Appl. No.: 17/831,450

(22) Filed: Jun. 3, 2022

(65) Prior Publication Data

US 2022/0414488 A1    Dec. 29, 2022

(30) Foreign Application Priority Data

Jun. 28, 2021   (CN) .......................... 202110719605.6

(51) Int. Cl.
G06N 5/02      (2023.01)
G06N 5/022     (2023.01)

(52) U.S. Cl.
CPC .................................. *G06N 5/022* (2013.01)

(58) Field of Classification Search
None
See application file for complete search history.

(56) References Cited

FOREIGN PATENT DOCUMENTS

| CN | 202904847 U | 4/2013 |
|----|-------------|--------|
| CN | 108563747 A | 9/2018 |
| CN | 111078868 A | 4/2020 |
| CN | 111949307 A | 11/2020 |
| CN | 112015911 A | 12/2020 |

OTHER PUBLICATIONS

Guan et al ("Application Prospect of Knowledge Graph Technology in Knowledge Management of Oil and Gas Exploration and Development" 2019) (Year: 2019).*
Kumar et al ("Mathematical Modeling of Managed Pressure Drilling" 2017) (Year: 2017).*
Sohrabi et al ("State Projection via AI Planning" 2017) (Year: 2017).*

* cited by examiner

*Primary Examiner* — Lut Wong
(74) *Attorney, Agent, or Firm* — Nitin Kaushik

(57) ABSTRACT

The present invention provides a processing method and device for data of a well site test based on a knowledge graph. The processing method for the data of the well site test based on the knowledge graph comprises: carrying out format identification on received historical data of the well site test to generate format identification results; establishing a mind map according to the format identification results; generating the knowledge graph of the data of the well site test according to the mind map; and processing the historical data of the well site test and new data of the well site test according to the knowledge graph.

4 Claims, 17 Drawing Sheets

PROCESSING METHOD AND DEVICE FOR DATA OF WELL SITE TEST BASED ON KNOWLEDGE GRAPH

CROSS-REFERENCE TO RELATED APPLICATIONS

The application claims priority to Chinese patent application No. 2021107196056 filed on Jun. 28, 2021, the entire contents of which are incorporated herein by reference.

TECHNICAL FIELD

The present invention relates to the technical field of petroleum and natural gas drilling, and specifically relates to a processing method and device for data of a well site test based on a knowledge graph.

BACKGROUND

In the prior art, the process of a well site test comprises planning the test, assembling instruments, testing performances, testing functions before going down to a well, testing actual drilling, summarizing the test and so on; and the number of processes is large, and each process has structured, unstructured and semi-structured data corresponding to code criteria, research materials, summary reports, references, test data and so on. It can be seen that the whole process of the well site test has the technological difficulties of complex management for data files and difficult searching for valuable files, so as to cause the problems that records of individual achievements and experience of the test are lack of standardized management and so on, directly leading to the problem that knowledge and the valuable files cannot be quickly positioned, shared and applied.

In recent years, a management manner of enterprise files is changed through the development and application of the information technology, so that the management efficiency is improved, and the diversity and integrity of data of the files are also ensured. At present, some professional management methods (platforms) for the files and knowledge bases are emerged, such as xyplorer, tagLyst, Yuque and the like; and meanwhile, some application software of a mind map is widely developed, such as Xmind, MindMaster and the like. With reference to Tab. 1, a file and knowledge management method, which is popular currently, tend to popular application, have advantages and disadvantages, are lack of targeted customization, are difficult to effectively integrate knowledge graphs and file management and cannot be used for solving the problem of management for various instruments, a lot of data, files and corresponding knowledge in the well site test of the petroleum industry.

TABLE 1

| Name of Software | Application of Software | Advantages of Software | Limitation of Software |
| --- | --- | --- | --- |
| xyplorer | File manager | Being capable of replacing a native file manager to a large extent and having a browser shortcut key and a mouse shortcut. | Poor multi-user collaboration and weak data visualization and analysis functions |
| tag Lyst | File data manager | Printing multiple labels on one file to realize multi-dimensional management for the file, and carrying out efficient searching for an achieved file by the labels and keywords. | Poor relevance between the files and weak visualization and analysis functions |
| Yuque | File and knowledge management tool | Providing the management function for a project file and a learning note and realizing summarization for fragmented and structured knowledge. | Limited cloud storage space, low security and weak visualization and analysis functions |
| Xmind | Mind map drawing software | Being capable of drawing a mind map and drawing a fishbone diagram, a two-dimensional diagram, a tree diagram, a logic diagram and an organization chart. | Weak file management function |
| MindMaster | Mind map software | Carrying out project management, knowledge management, conference management and content summarization for a reading note. | Weak file management function |

SUMMARY

For the problems in the prior art, the present invention provides a processing method and device for data of a well site test based on a knowledge graph, so that the functions of storage, management, sharing, querying, concentrated display and so on of the data in the whole process of the well site test can be realized, a relationship between the data is established, and the data querying efficiency is improved, so as to provide support for tackling the problems in the technology.

In order to solve the above technical problems, the present invention provides the following technical solutions.

In a first aspect, the present invention provides the processing method for the data of the well site test based on the knowledge graph, which comprises:

carrying out format identification on received historical data, historical text files, historical audio files, historical picture files, historical video files and so on of the well site test, so as to generate format identification results;

establishing a mind map of the files according to the format identification results;

generating a knowledge graph of the data of the well site test according to the mind map; and processing the historical data, the historical text files, the historical audio files, the historical picture files, the historical video files and so on of the well site test, as well as new data, new text files, new audio files, new picture files, new video files and so on of the well site test according to the knowledge graph.

In one embodiment, carrying out format identification on the received historical data of the well site test to generate the format identification results comprises:

receiving a processing request of the data of the well site test of a user;

extracting file names, categories of operation objects and file formats from the processing request; and scanning a target directory to judge that whether folder structure objects corresponding to the file formats exist or not, so as to generate the format identification results.

In one embodiment, establishing the mind map according to the format identification results comprises:

determining keywords of the data of the well site test according to the format identification results;

establishing a data storage bank with a multi-level relationship according to the multiple keywords and a preset term dictionary of the well site test; and establishing the mind map according to the data storage bank.

In one embodiment, the identification results comprise: structured data, semi-structured data and unstructured data; and determining the keywords of the data of the well site test according to the format identification results comprises:

carrying out grammar analysis on the structured data, so as to determine keywords of the structured data; and calibrating labels of the semi-structured data and the unstructured data, so as to determine keywords of the semi-structured data and the unstructured data.

In one embodiment, carrying out grammar analysis on the structured data to determine the keywords of the structured data comprises:

carrying out term extraction on the structured data according to the term dictionary of the well site test;

selecting terms, the number of appearing frequencies of which is more than the preset number of times, from extraction results;

generating feature vectors of the structured data according to the terms, the number of appearing frequencies of which is more than the preset number of times; and generating the keywords of the structured data according to the feature vectors.

In one embodiment, calibrating the labels of the semi-structured data and the unstructured data to determine the keywords of the semi-structured data and the unstructured data comprises:

calculating literal text similarities of the semi-structured data/the unstructured data and the term dictionary of the well site test; and selecting part of data from the semi-structured data and the unstructured data and calibrating the part of data according to the literal text similarities.

In one embodiment, the step of generating the knowledge graph of the data of the well site test according to the mind map comprises:

carrying out granularity entity identification on the format identification results according to the mind map, so as to generate identification results;

establishing a knowledge level of the data of the well site test according to the identification results;

extracting entity data of the data of the well site test according to the identification results; and generating the knowledge graph according to the knowledge level and the entity data.

In a second aspect, the present invention provides the processing device for the data of the well site test based on the knowledge graph, which comprises:

an identification result generation module, which is used for carrying out format identification on the received historical data of the well site test to generate the format identification results;

a mind map establishing module, which is used for establishing the mind map according to the format identification results;

a knowledge graph generation module, which is used for generating the knowledge graph of the data of the well site test according to the mind map; and a data processing module, which is used for processing the historical data of the well site test and the new data of the well site test according to the knowledge graph.

In one embodiment, the identification result generation module comprises:

a processing request receiving unit, which is used for receiving the processing request of the data of the well site test of the user;

a request extraction unit, which is used for extracting the file names, the categories of the operation objects and the file formats from the processing request; and an identification result generation unit, which is used for scanning the target directory to judge that whether the folder structure objects corresponding to the file formats exist or not, so as to generate the format identification results.

In one embodiment, the mind map establishing module comprises:

a keyword determination unit, which is used for determining the keywords of the data of the well site test according to the format identification results;

a data storage bank establishing unit, which is used for establishing the data storage bank with the multi-level relationship according to the multiple keywords and the preset term dictionary of the well site test; and a mind map establishing unit, which is used for establishing the mind map according to the data storage bank.

In one embodiment, the identification results comprise: the structured data, the semi-structured data and the unstructured data; and the keyword determination unit comprises:

a data grammar analysis unit, which is used for carrying out grammar analysis on the structured data, so as to determine the keywords of the structured data; and a label calibrating unit, which is used for calibrating the labels of the semi-structured data and the unstructured data, so as to determine the keywords of the semi-structured data and the unstructured data.

In one embodiment, the data grammar analysis unit comprises:

a term extraction unit, which is used for carrying out term extraction on the structured data according to the tem dictionary of the well site test;

a term selection unit, which is used for selecting the terms, the number of appearing frequencies of which is more than the preset number of times, from the extraction results;

a feature vector generation unit, which is used for generating the feature vectors of the structured data according to the terms, the number of appearing frequencies of which is more than the preset number of times; and a keyword generation unit, which is used for generating the keywords of the structured data according to the feature vectors.

In one embodiment, the label calibrating unit comprises:

a similarity calculation unit, which is used for calculating the literal text similarities of the semi-structured data/the unstructured data and the term dictionary of the well site test; and a part calibrating unit, which is used for selecting part of data from the semi-structured data and the unstructured data and calibrating the part of data according to the literal text similarities.

In one embodiment, the knowledge graph generation module comprises:

a granularity identification unit, which is used for carrying out granularity entity identification on the format identification results according to the mind map, so as to generate the identification results;

a knowledge level establishing unit, which is used for establishing the knowledge level of the data of the well site test according to the identification results;

an entity data extraction unit, which is used for extracting the entity data of the data of the well site test according to the identification results; and a knowledge graph generation unit, which is used for generating the knowledge graph according to the knowledge level and the entity data.

In a third aspect, the present invention provides electronic equipment, which comprises a memory, a processor and a computer program which is stored in the memory and can operate in the processor; and the processor is configured to execute the program to realize the steps of the processing method for the data of the well site test based on the knowledge graph.

In a fourth aspect, the present invention provides a computer readable storage medium; the computer program is stored in the computer readable storage medium; and the computer program is executed by the processor to realize the steps of the processing method for the data of the well site test based on the knowledge graph.

It can be known from the above description that the processing method and device for the data of the well site test based on the knowledge graph, which are provided by the embodiments of the present invention comprise: firstly, carrying out format identification on the received historical data of the well site test to generate the format identification results; establishing the mind map according to the format identification results; then, generating the knowledge graph of the data of the well site test according to the mind map; and finally, processing the historical data of the well site test and the new data of the well site test according to the knowledge graph. According to the processing method and device for the data of the well site test based on the knowledge graph, which are provided by the present invention, the functions of storage, management, sharing, querying, concentrated display and so on of the data in the whole process of the well site test can be realized, the relationship between the data is established, and the data querying efficiency is improved, so as to provide the support for tackling the problems in the technology.

DETAILED DESCRIPTION OF THE EMBODIMENTS

Figure 1:
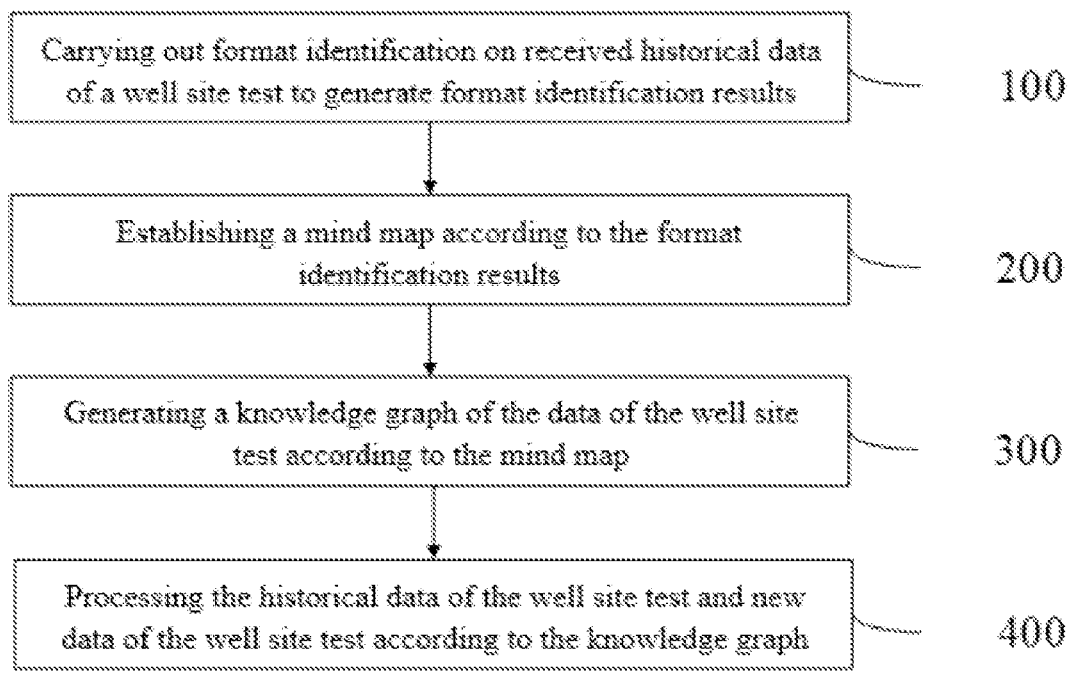
FIG. 1 is a schematic flow diagram of a processing method for data of a well site test based on a knowledge graph in an embodiment of the present invention.

An embodiment of the present invention provides a specific implementation manner of a processing method for data of a well site test based on a knowledge graph. With reference to FIG. 1, the method specifically comprises the following contents:

Step 100: carrying out format identification on received historical data of the well site test to generate format identification results, wherein specifically, the Step 100 comprises: sending/receiving and resolving binary streams and attached operation commands of files sent by a user through a network request; extracting information of file names, categories of operation objects and file formats from command parameters; scanning a target directory to judge that whether folder structure objects corresponding to the extracted file formats exist or not; if a folder structure which is the same as an extracted file directory structure is determined to be nonexistent, creating the folder structure and writing a corresponding unstructured file object under an created folder (the unstructured file object comprises: a technical file, a picture/an audio/a video, an instrument and equipment ledger, actual drilling data and so on; and additionally, it may be understood that the number of types of the data is large, and a file relationship is complex, which are the difficulties of management for files of the well site test and are also the problems that cannot be solved by the existing software at present.);

Step 200: establishing a mind map according to the format identification results, wherein it may be understood that the mind map refers to an idea of using one center keyword or one idea to cause the picturesque structure and classification, and the mind map is a graphic mode that one center keyword or one idea is connected with all representative words and phrases, ideas, missions or other associated items in a radiation form; and specifically, the Step 200 comprises: generating the mind map according to a level relationship of folders of a data storage bank, wherein files corresponding to corresponding folders are reserved at nodes of the mind map; labels of the folders in the data storage bank can represent the attributes of the folders, and comprehensive display of charts and so on can be realized by counting the number of files in the folders with different attributes; the files can be previewed, notes are taken for the files, and a report is generated; and exported files have a level structure of the folders in the data storage bank.

Step 300: generating the knowledge graph of the data of the well site test according to the mind map, wherein the knowledge graph refers to a knowledge domain visible map or a knowledge domain mapping, comprises a series of various graphs for displaying a relationship between the development course and the structure of knowledge, is used for describing knowledge resources and carriers thereof by adopting a visualization technology, and is used for digging, analyzing, constructing, drawing and displaying the knowledge and the interrelation among the knowledge; and further, through combination of theories and methods of disciplines of applied mathematics, graphics, an information visualization technology, information science and so on and methods of citation analysis, co-occurrence analysis and so on of metrology, the knowledge graph is used for vividly displaying a modern theory which achieves the purpose of multi-disciplinary integration in the aspects of the core structure, the history of development, frontier domains and the overall knowledge framework of the disciplines by utilizing a visible graph; and the user can customize a set of project library structures and can construct the directory structure, the categories of the files and the outline of a theme; the data storage bank can be reserved as a knowledge graph template after the data storage bank is constructed, can be referred repeatedly and is more convenient and more efficient especially in the development of a process project; for example, in a new project, the existing mind map is enabled to form a template, and when a new mind map is established, the template can be directly applied as the mind map or can be adjusted as the mind map; further, a knowledge graph is established according to the mind map obtained based on a level structure of files; and meanwhile, labels can be established for each imported file, and a new mind map and a new knowledge graph are established according to the labels, so that the mind map can be established according to the time schedule, the event progress and so on, and the corresponding knowledge graph is formed; and Step 400: processing the historical data of the well site test and new data of the well site test according to the knowledge graph, wherein for the problems that the well site test has the problems of complex management for data files, difficult searching for valuable files, lack of standardized management in records of individual achievements and experience of the test at present, directly leading to the problem that the knowledge and the valuable files cannot be quickly positioned and shared, through adoption of the knowledge graph generated in the Step 400 of the present invention, the functions of storage, management, sharing, querying, concentrated display and so on of the data in the whole process of the well site test can be realized, a relationship between the data is established, and the data querying efficiency is improved, so as to provide support for tackling the problems in the technology; and it can be known from the above description that the processing method for the data of the well site test based on the knowledge graph, which is provided by the embodiment of the present invention comprises: firstly, carrying out format identification on the received historical data of the well site test to generate the format identification results; establishing the mind map according to the format identification results; then, generating the knowledge graph of the data of the well site test according to the mind map; and finally, processing the historical data of the well site test and the new data of the well site test according to the knowledge graph. According to the processing method and device for the data of the well site test based on the knowledge graph, which are provided by the present invention, the functions of storage, management, sharing, querying, concentrated display and so on of the data in the whole process of the well site test can be realized, the relationship between the data is established, and the data querying efficiency is improved, so as to provide the support for tackling the problems in the technology.

Figure 2:
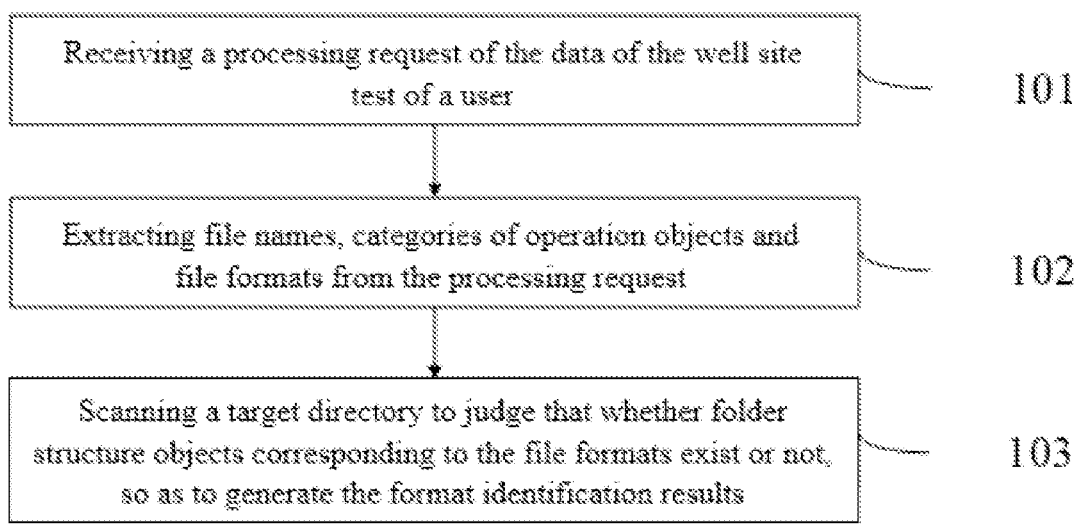
FIG. 2 is a schematic flow diagram of a Step 100 in an embodiment of the present invention.

In one embodiment, with reference to FIG. 2, the Step 100 further comprises:

Step 101: receiving a processing request of the data of the well site test of the user;

Step 102: extracting the file names, the categories of the operation objects and the file formats from the processing request; and Step 103: scanning the target directory to judge that whether the folder structure objects corresponding to the file formats exist or not, so as to generate the format identification results.

Figure 3:
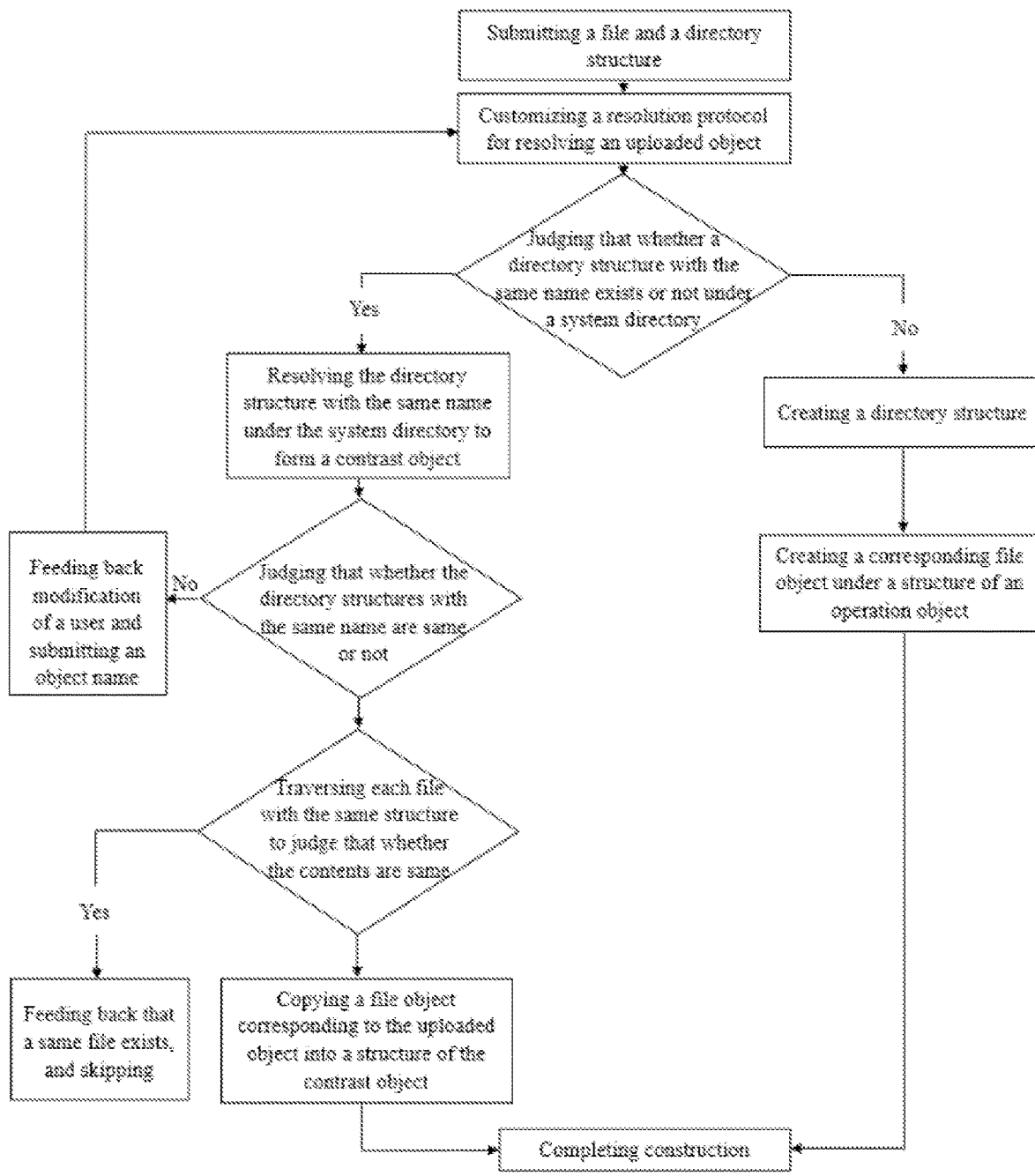
FIG. 3 is a mind map of the Step 100 in the embodiment of the present invention.

With reference to FIG. 3, in the Step 101 to the Step 103, if folder names, which are the same as the extracted file directory structure, are determined to be existent, and files, which are the same as the extracted file names, are determined to be nonexistent under the corresponding folders, extracted file objects are written under the corresponding folders; if the files, which are the same as the extracted file names, are determined to be existent, and the files, which are the same as the extracted file names, are the same as the contents of the extracted operation objects, the operation objects exist is informed to a user system; and if the files, which are the same as the extracted file names, are determined to be existent, and the files, which are the same as the extracted file names, are different from the contents of the extracted operation objects, the files, which are the same as the extracted file names, can be renamed according to a preset version upgrade rule, and the extracted operation objects are written under the corresponding folders.

Relatively, if folders corresponding to the extracted file formats are determined to be existent, and files, which are the same as the extracted file names or the same as the contents, are determined to be nonexistent under the corresponding folders, the extracted file operation objects are written under the corresponding folders; if the folders corresponding to the extracted file formats are determined to be existent, and files, which are different from the extracted file names or the same as the contents of the extracted operation objects, are determined to be existent under the corresponding folders, the user can be prompted to select and use file names of the existing files or the extracted file names as file names of the operation objects; and if the folders corresponding to the extracted file formats are determined to be existent, files, which are the same as the extracted file names or are different from the contents of the extracted operation objects, are determined to be existent under the corresponding folders, the files, which are the same as the extracted file names, can be renamed according to a preset version upgrade rule, and the extracted operation objects are written under the corresponding folders.

Figure 4:
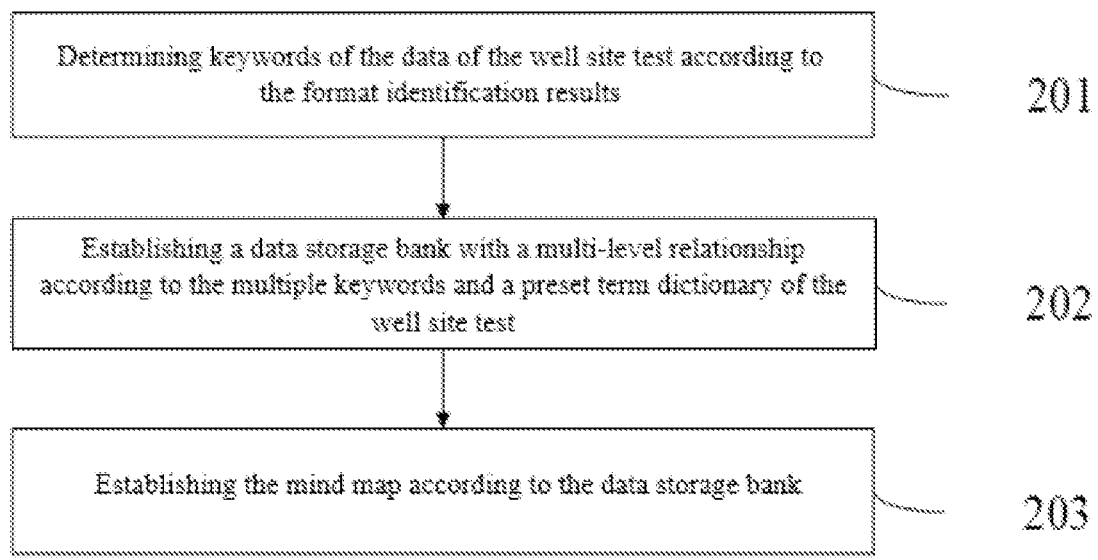
FIG. 4 is a schematic flow diagram of a Step 200 in an embodiment of the present invention.

In one embodiment, with reference to FIG. 4, the Step 200 further comprises:

Step 201: determining keywords of the data of the well site test according to the format identification results;

Step 202: establishing the data storage bank with a multi-level relationship according to the multiple keywords and a preset term dictionary of the well site test; and Step 203: establishing the mind map according to the data storage bank.

In the Step 201 to the Step 203, the files are classified according to the extracted data; 14 database tables and 84 fields are designed according to main keywords contained in the files of a well site; and a data storage structure table is established. The types of the folders in corresponding data storage parts are different according to different classifications and different storage structures of the keywords. The extracted data of one file corresponds to part of tables and fields in the database tables, so that labels, a category, basic information and so on corresponding to the file are stored and are matched to a corresponding folder in the data storage bank according to keywords. The preset folders have a level relationship, are folders set according to a logic relationship of the event dimensionality of a project and are endowed with the actual meaning, i.e. folder names; multiple folders and multiple folder names form the data storage bank; and finally, the mind map is generated according to a level relationship of multiple nodes and the contents represented by the nodes in the data storage bank.

In one embodiment, the identification results comprise: structured data, semi-structured data and unstructured data.

Figure 5:
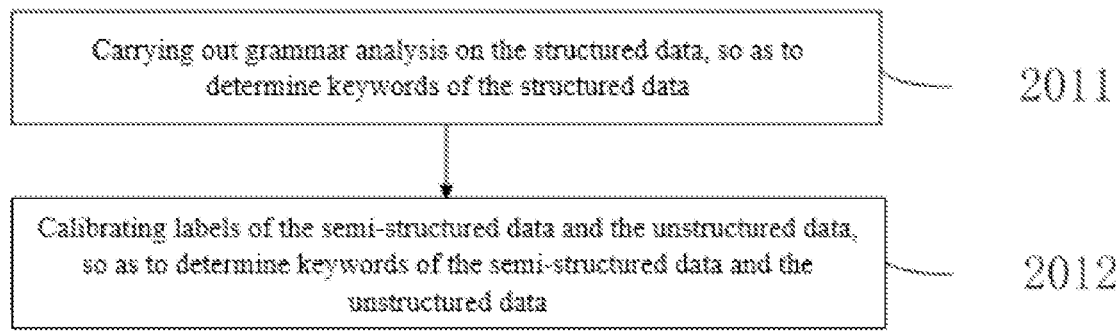
FIG. 5 is a schematic flow diagram of a Step 201 in an embodiment of the present invention.

In one embodiment, with reference to FIG. 5, the Step 201 further comprises:

Step 2011: carrying out grammar analysis on the structured data, so as to determine keywords of the structured data; and Step 2012: calibrating labels of the semi-structured data and the unstructured data, so as to determine keywords of the semi-structured data and the unstructured data.

Specifically, the implementation of the Step 2011 and the Step 2012 mainly comprises the following parts: extraction for data of structured files: carrying out grammar analysis to process part of the structured files; then, extraction for terms of the structured files; and finally, extraction for data of semi-structured/unstructured files: as the data of the semi-structured/unstructured files cannot be extracted through grammar analysis, adopting a manner of adding labels as the data of the semi-structured/unstructured files.

In the well site test, a large number of semi-structured/unstructured files appear. Preferably, the data are extracted by adopting two manners: (1) adopting an artificial definition extraction method and adding the labels of the semi-structured/unstructured files according to a term dictionary 2 of the well site test in an artificial manner, so as to realize extraction for the data: and (2) calculating literal text similarities and carrying out automatic matching to realize extraction. The data of file names, the establishing time, creators, creating positions and so on of the semi-structured/unstructured files is extracted, and the literal text similarities of each piece of data and terms in the term dictionary 2 of the well site test are calculated.

Figure 6:
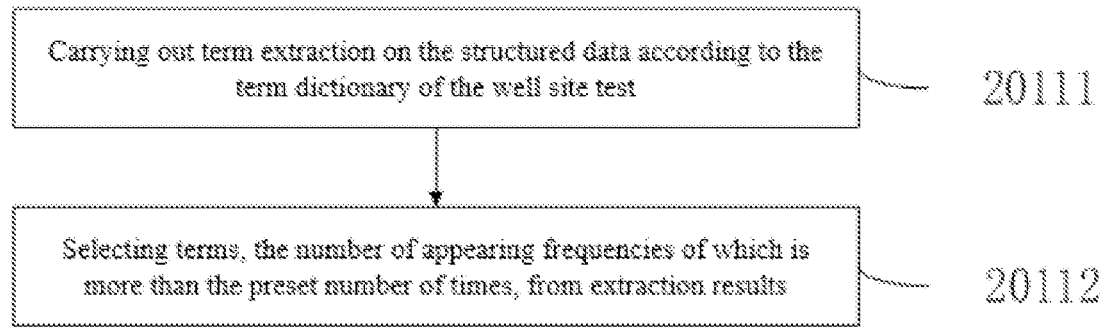
FIG. 6 is a schematic flow diagram of a Step 2011 in an embodiment of the present invention.

In one embodiment, with reference to FIG. 6, the Step 2011 further comprises:

Step 20111: carrying out term extraction on the structured data according to the term dictionary of the well site test;

Step 20112: selecting terms, the number of appearing frequencies of which is more than the preset number of times, from extraction results, wherein in the Step 20111 and the Step 20112, according to a storage request of the structured files, which is provided by a user machine, grammar analysis is carried out on the structured files of storage objects, so as to realize data extraction, which comprises: firstly, establishing term dictionaries of the well site test; establishing a term dictionary 1 of the well site test based on a professional term bank, the national standard, the industry standard and so on; and then, counting and inducing 10-20 times of well site tests, and intercepting vocabularies with the number of frequencies of being over a preset threshold (preferably, the preset threshold is 2-4 times.) according to the sort of the number of appearing frequencies of high-frequency vocabularies, so as to form the term dictionary 2 of the well site test.

Step 20113: generating feature vectors of the structured data according to the terms, the number of appearing frequencies of which is more than the preset number of times, wherein by taking the structured files as statistical samples, the appearing frequencies of the terms in the term dictionary 2 of the well site test are counted and are listed, so as to obtain the feature vectors of term extraction of the structured files, so that data extraction work of the structured files is realized; and Step 20114: generating the keywords of the structured data according to the feature vectors.

Figure 7:
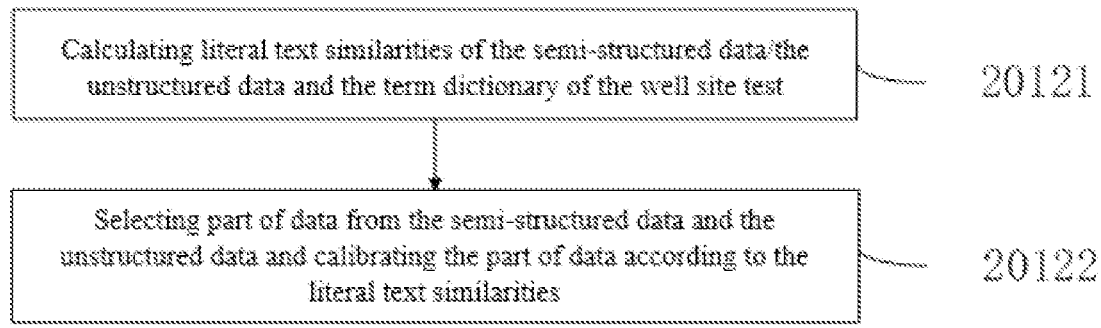
FIG. 7 is a schematic flow diagram of a Step 2012 in an embodiment of the present invention.

In one embodiment, with reference to FIG. 7, the Step 2012 further comprises:

Step 20121: calculating literal text similarities of the semi-structured data/the unstructured data and the term dictionary of the well site test; and Step 20122: selecting part of data from the semi-structured data and the unstructured data and calibrating the part of data according to the literal text similarities.

With reference to the formula 1, data with the highest literal text similarity are selected as the labels corresponding to the data, so as to realize extraction for the data of the semi-structured/unstructured files:

$$sim = 60 \times \left(\frac{xsword}{ctrlword} - \frac{xsword}{keyword}\right)/2 + 40 \times dp \times \left(\sum \frac{c\_xsword(i)}{\sum ctrlword(i)} + \sum \frac{k\_xsword(i)}{\sum keyword\ (i)}\right)/2 \quad (1)$$

wherein xsword represents the number of same characters of two vocabularies; ctrlword represents the number of characters contained in a matched word A; keyword represents the total number of characters contained in a to-be-matched word B; dp represents a position coefficient and the specific value of total characters of the matched word A and the to-be-matched word B;

$$\sum \frac{c\_xsword(i)}{\sum ctrlword(i)}$$

represents the sum of weight of the positions of the same characters contained in the two words A and B in the word A; and $$\sum \frac{k\_xsword(i)}{\sum keyword\ (i)}$$

represents the sum of weight of the positions of the same characters contained in the two words A and B in the word B.

Figure 8:
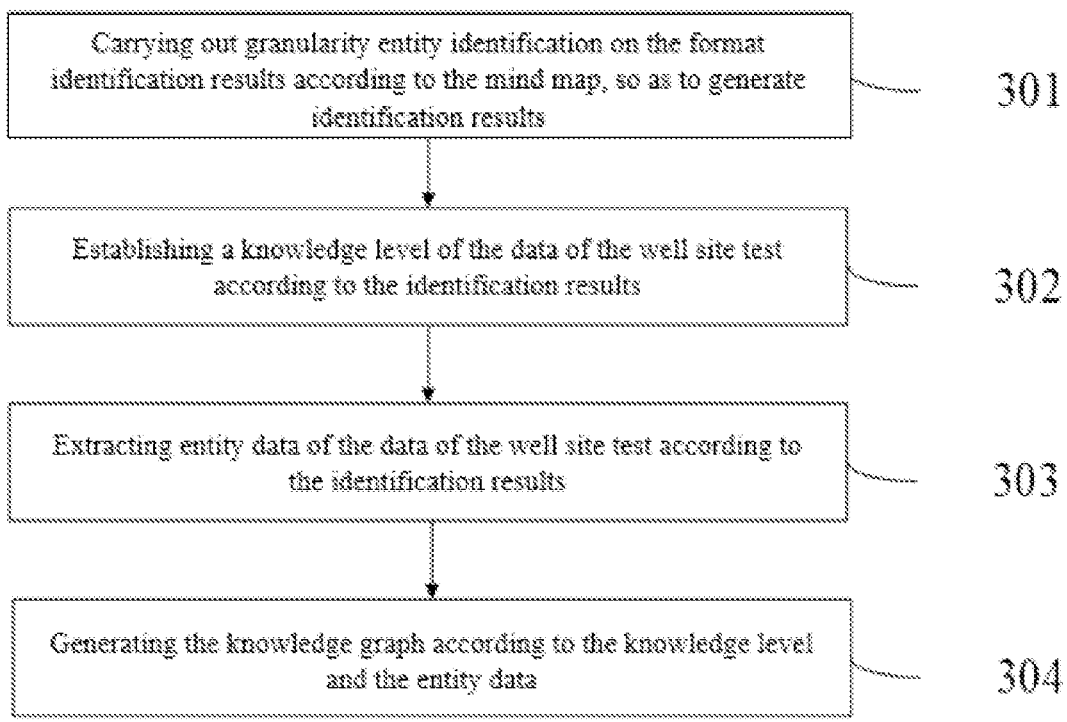
FIG. 8 is a schematic flow diagram of a Step 300 in an embodiment of the present invention.

In one embodiment, with reference to FIG. 8, the Step 300 further comprises:

Step 301: carrying out granularity entity identification on the format identification results according to the mind map, so as to generate identification results, wherein preferably, granularity entity identification is mainly divided into three phases: firstly, carrying out resolution on the data of the well site test and decomposing formats of various heterogeneous data in resources of text archives, audio/video archives, archive metadata, XML (Extensive Markup Language) data and so on; carrying out entity description on the data of the well site test from a knowledge level based on data resolution, and revealing resources of the data of the well site test through designing for a metadata architecture of the data of the well site test and constructing for the knowledge level of the data of the well site test; and finally, establishing an entity extraction rule based on the data of the well site test through combination with elements such as part-of-speech characteristics and the like of entities of the data of the well site test and with reference to a dictionary related to science and technology (the term dictionary 2 can also be used.), and completing entity extraction for the data of the well site test by a deep learning model and so on; and fine granularity entity identification for the data of the well site test is completed through data resolution, deep revelation and entity extraction for the data of the well site test, so as to provide data support for a research on semantic association of the data of the well site test;

Step 302: establishing the knowledge level of the data of the well site test according to the identification results, wherein the resources of the data of the well site test comprises metadata of the resources of the data of the well site test and also comprises own knowledge of the resources of the data of the well site test, so that a content level should be identified through granularity processing for the resources of the data of the well site test, i.e. a research mission, a research thought, a construction plan, an evaluation targets and other entities in the knowledge level of the resources of the data of the well site test; and in a data revelation process of the knowledge level of the data of the well site test, grammars and semanteme of a corpus definition sentence of the data of the well site test need to he analyzed, entity identification is carried out by virtue of a semantic technology, and the high-frequency vocabularies and keywords of the knowledge level of the data of the well site test are extracted;

Step 303: extracting entity data of the data of the well site test according to the identification results, wherein in order to carry out the research on the data of the well site test, which has semantic association, the entities of the data of the well site test need to he extracted based on the data resolution and deep revelation for the data of the well site test, so that an association relationship is established between the entities of the data of the well site test as minimum knowledge units of the data of the well site test and other knowledge units; therefore, the extraction for the entities of the data of the well site test can be completed by utilizing a named entity identification technology, a natural language processing technology and other technologies at the last phase of fine granularity entity identification for the data of the well site test; instance data of the entities of deep revelation is distinguished and separated out from the resources of the data of the well site test through data resolution based on classifications and attribute definitions of the resources of the data of the well site test; according to the data structure and characteristics of the resources of the data of the well site test and in order to improve the performance of entity extraction for the resources of the data of the well site test, the entity extraction rule based on the data of the well site test is established through introduction of the dictionary related to science and technology and combination with the elements such as the part-of-speech characteristics and the like; a knowledge extraction model commonly used at preset comprises a CRF (Conditional Random Field) model, a BiLSTM (Bi-directional Long Short-Term Memory) model and so on (Xiu Xiaolei, 2019); keywords or high-frequency vocabularies from a semantic level of the resources of the data of the well site test, such as a research mission C, an implementation plan, evaluation targets, appropriation budget and other entities, can be obtained through combination with a semantic dictionary of the data of the well site test and based on the named entity identification technology and other technologies; as the resources of the data are different, the entities obtained when in entity extraction are also changed, the four entities are only general entities in entity extraction for the resources of the data of the well site test, and the entities need to be further refined according to the data characteristics when in specific extraction for certain data of the well site test; and after entity extraction, the entities of the data of the well site test can be intelligently proofread by utilizing semantic comprehension, explanations of nouns such as an institutional knowledge base and the like in a knowledge base, etc. and then are input in the knowledge base through artificial audit, so that the error rate is reduced to the lowest level; and Step 304: generating the knowledge graph according to the knowledge level and the entity data, wherein firstly, a proper language for constructing the knowledge graph needs to be selected, and the knowledge graph is constructed by adopting an OWL Lite language in the present invention; then, the knowledge graph is constructed under the overall framework of the knowledge level by utilizing the OWL Lite language and the entity data in the Step 304; in another aspect, the constructed knowledge graph supports sharing of files, projects and project libraries; exported files and projects are exported in a set level structure of the folders in the data storage bank; and when the knowledge base of the files is browsed, key information can be selected and captured in the files (WORD, EXCEL, PPT and so on) to form notes, and the notes are arranged to generate result files, such as a test report, a data report and the like.

Figure 9:
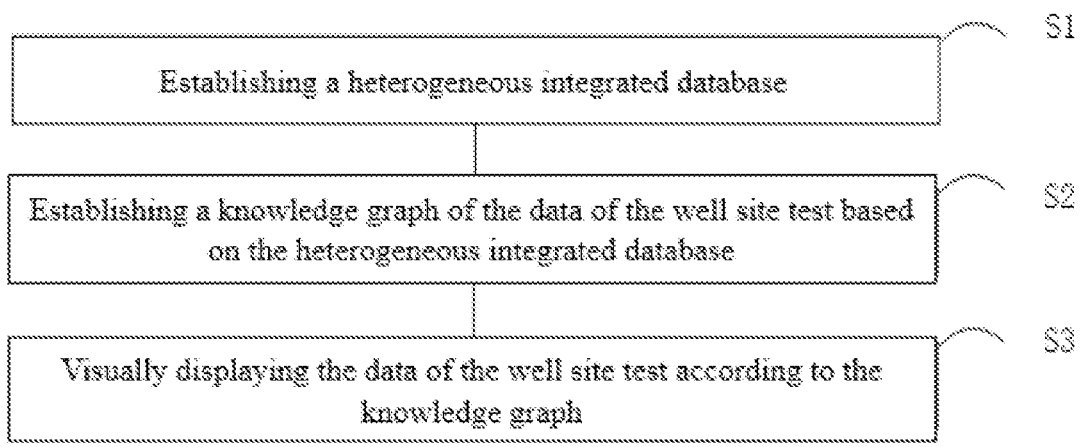
FIG. 9 is a schematic flow diagram of the processing method for the data of the well site test based on the knowledge graph in a specific application example of the present invention.

In order to further describe the solution, the present invention also provides a specific application example of the processing method for the data of the well site test based on the knowledge graph, which specifically comprises the following contents, with reference to FIG. 9:

S1: establishing a heterogeneous integrated database, wherein specifically, format identification is carried out on files, so that the files are divided into structured files and semi-structured/unstructured files; and then data extraction is carried out, and grammar analysis is carried out on the structured files of storage objects according to a storage request of the structured files, which is provided by a user machine, so as to realize data extraction:

S2: establishing a knowledge graph of the data of the well site test based on the heterogeneous integrated database, wherein it may be understood that in the Step S2, structured data, unstructured data and semi-structured data of the test of the whole process need to be uploaded; unified management is carried out in a project library form; a manner of importing the data of the well site test into a project library at one time/in batches can be adopted; the project library is created before or after the files are uploaded; specifically, the Step S2 comprises: firstly, constructing basic information of the project library, including a project name, a project cycle, a project brief and so on; secondly, setting dimension classifications and names of a project default map; and thirdly, adding labels for a single file or batch files that is/are uploaded and generating a mind map according to the current structure or constructing a new mind map; and the Step S2 comprises: management for reading marks of the files: saving and importing marks, annotations and so on of knowledge points of the files; permission setting for the data of the files: setting permissions that the files can be seen by yourself, the files can be seen by part of users, the files are shared to all users, etc.; and management and output for data labels: for the uploaded data of the test, realizing data management, including the functions of adding, editing and deleting the data labels, editing a data relationship, editing and deleting data materials, outputting the data and so on; and S3: visually displaying the data of the well site test according to the knowledge graph, wherein the mind map with the same framework can be automatically generated according to a level relationship of folders of a data storage bank, so as to visualize a project in a mind map form; a file corresponding to a corresponding folder is reserved at each node of the mind map, and a node name is named by a folder name; different labels of the folders reflect different attributes of the files in the folders; the number of the files with different attributes is counted; the data of the database, such as a plan, the progress, key indexes, tangible results and the like, are visualized by adopting a similar Office UI (User Interface) style and in a combining form of charts and so on; an accurate result can be fast searched according to input of the user by adopting a file resource model similar to an RDF (Request Definition File); a visible knowledge base is searched according to a modified date, a user level mark, a type and so on; and different categories of query and search for a title, keywords, the creation time, a knowledge owner, a label and so on of the knowledge base are supported.

It can be known from the above description that the processing method for the data of the well site test based on the knowledge graph, which is provided by the embodiment of the present invention comprises: carrying out format identification on the files, so that the files are divided into the structured files and the semi-structured/unstructured files; obtaining the keywords of the files through grammar analysis for the structured files and label calibration for the semi-structured/unstructured files; establishing multiple folders with the level relationship as the data storage bank according to main keywords contained in the files of a well site, and taking the corresponding keywords as folder names; matching the keywords of the files and the folder names and inputting the files into the folders; and carrying out management functions of calibrating, adding and deleting the labels for the folders and the files in the data storage bank.

Based on the same inventive concept, an embodiment of the present application also provides a processing device for data of a well site test based on a knowledge graph, which can be used for realizing the method described by the above embodiment, which is shown as a following embodiment. As the principle of solving problems of the processing device for the data of the well site test based on the knowledge graph is similar to the processing method for the data of the well site test based on the knowledge graph, the implementation of the processing device for the data of the well site test based on the knowledge graph can refer to the implementation of the processing method for the data of the well site test based on the knowledge graph, and repeated parts are not repeated. A term 'unit' or 'module' used hereinafter may be a combination of software and/or hardware for realizing preset functions. Although a system described by the following embodiment is preferably realized by software, the realization of the hardware or the combination of the software and the hardware is also possibly conceived.

An embodiment of the present invention provides a specific implementation manner of the processing device for the data of the well site test based on the knowledge graph, which can be used for realizing the processing method for the data of the well site test based on the knowledge graph.

Figure 10:
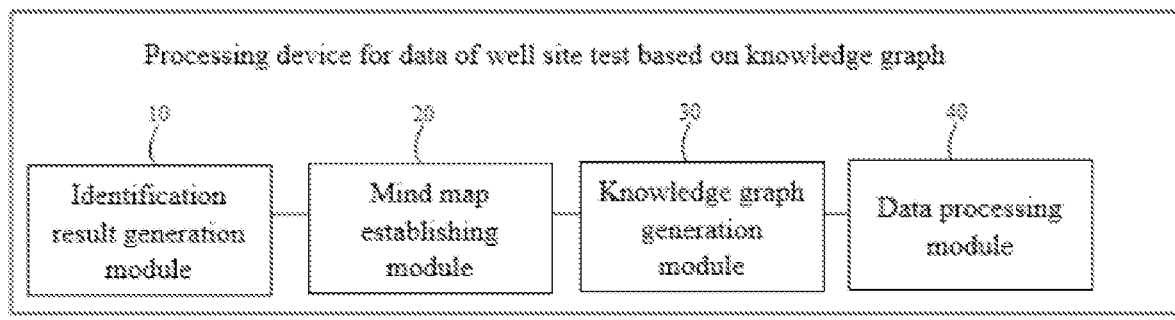
FIG. 10 is a structural block diagram of a processing device for data of a well site test based on a knowledge graph in an embodiment of the present invention.

With reference to FIG. 10, the processing device for the data of the well site test based on the knowledge graph specifically comprises the following contents:

an identification result generation module 10, which is used for carrying out format identification on the received historical data of the well site test to generate the format identification results;

a mind map establishing module 20, which is used for establishing the mind map according to the format identification results;

a knowledge graph generation module 30, which is used for generating the knowledge graph of the data of the well site test according to the mind map; and a data processing module 40, which is used for processing the historical data of the well site test and the new data of the well site test according to the knowledge graph.

Figure 11:
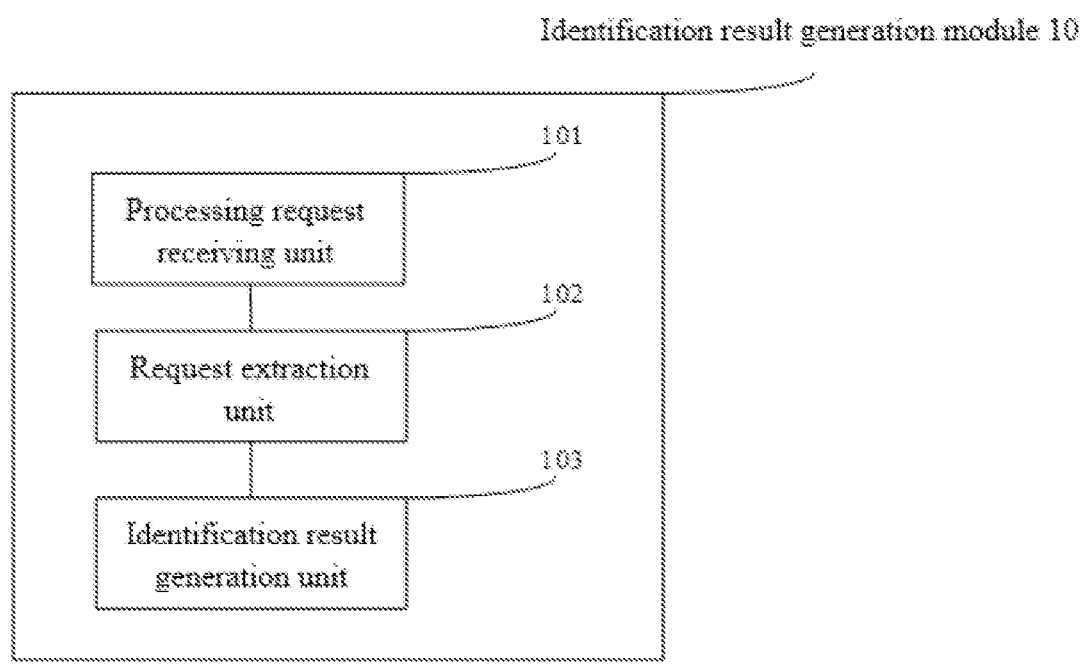
FIG. 11 is a structural schematic diagram of an identification result generation module 10 in an embodiment of the present invention.

In one embodiment, with reference to FIG. 11, the identification result generation module 10 comprises:

a processing request receiving unit 101, which is used for receiving the processing request of the data of the well site test of the user;

a request extraction unit 102, which is used for extracting the file names, the categories of the operation objects and the file formats from the processing request; and an identification result generation unit 103, which is used for scanning the target directory to judge that whether the folder structure objects corresponding to the file formats exist or not, so as to generate the format identification results.

Figure 12:
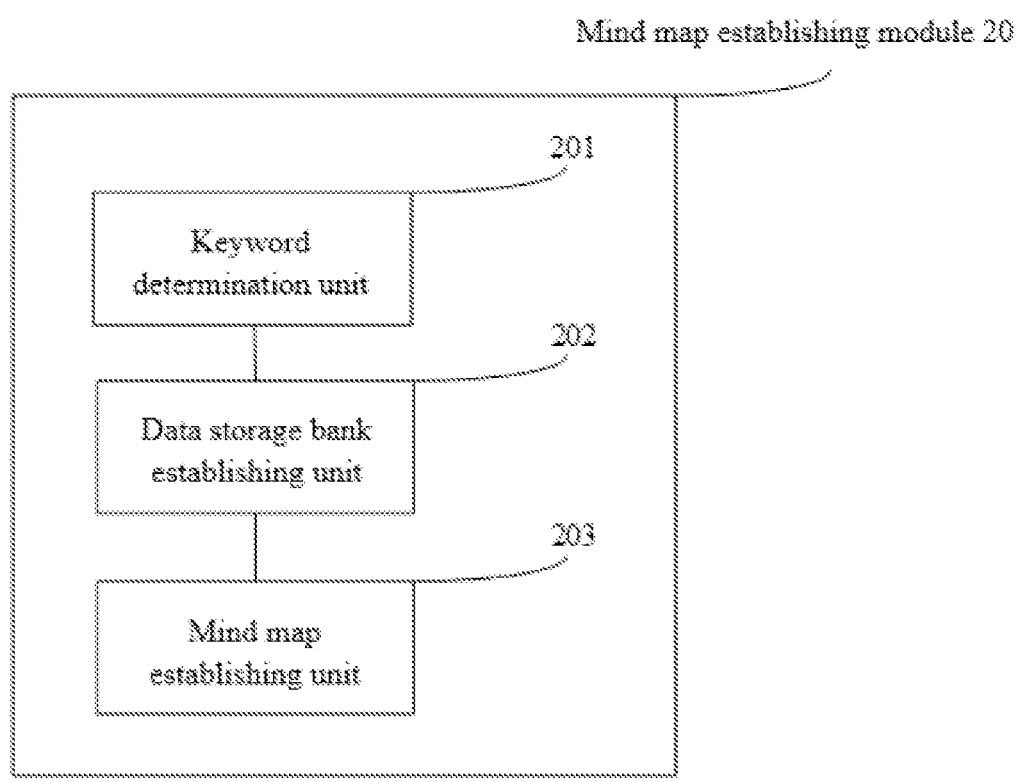
FIG. 12 is a structural schematic diagram of a mind map establishing module 20 in an embodiment of the present invention.

In one embodiment, with reference to FIG. 12, the mind map establishing module 20 comprises:

a keyword determination unit 201, which is used for determining the keywords of the data of the well site test according to the format identification results;

a data storage bank establishing unit 202, which is used for establishing the data storage bank with the multi-level relationship according to the multiple keywords and the preset term dictionary of the well site test; and a mind map establishing unit 203, which is used for establishing the mind map according to the data storage bank.

In one embodiment, the identification results comprise: the structured data, the semi-structured data and the unstructured data.

Figure 13:
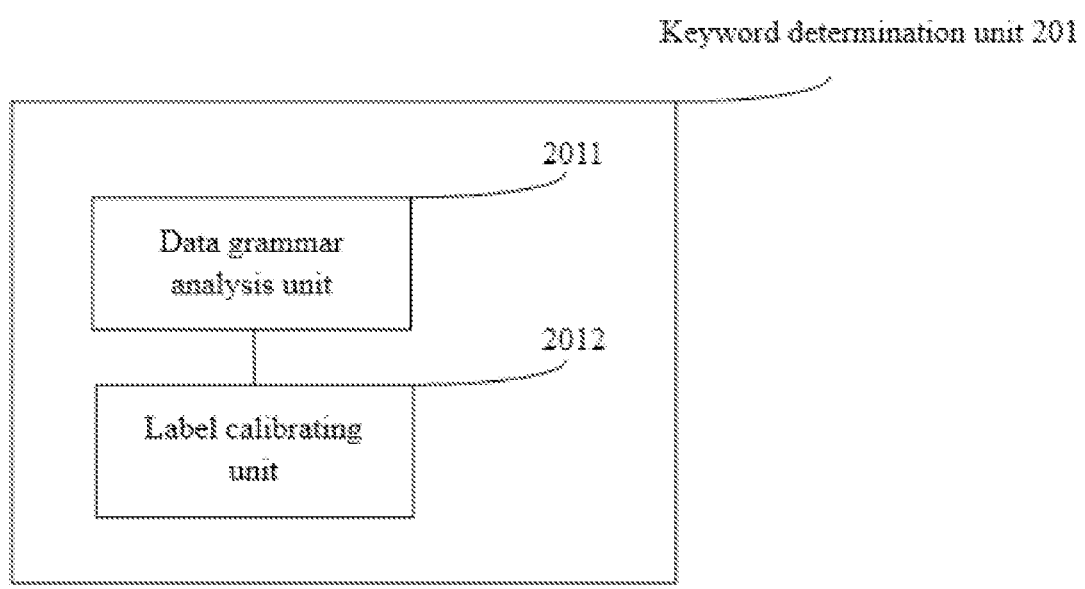
FIG. 13 is a structural schematic diagram of a keyword determination unit 201 in an embodiment of the present invention.

In one embodiment, with reference to FIG. 13, the keyword determination unit 201 comprises:

a data grammar analysis unit 2011, which is used for carrying out grammar analysis on the structured data, so as to determine the keywords of the structured data; and a label calibrating unit 2012, which is used for calibrating the labels of the semi-structured data and the unstructured data, so as to determine the keywords of the semi-structured data and the unstructured data.

Figure 14:
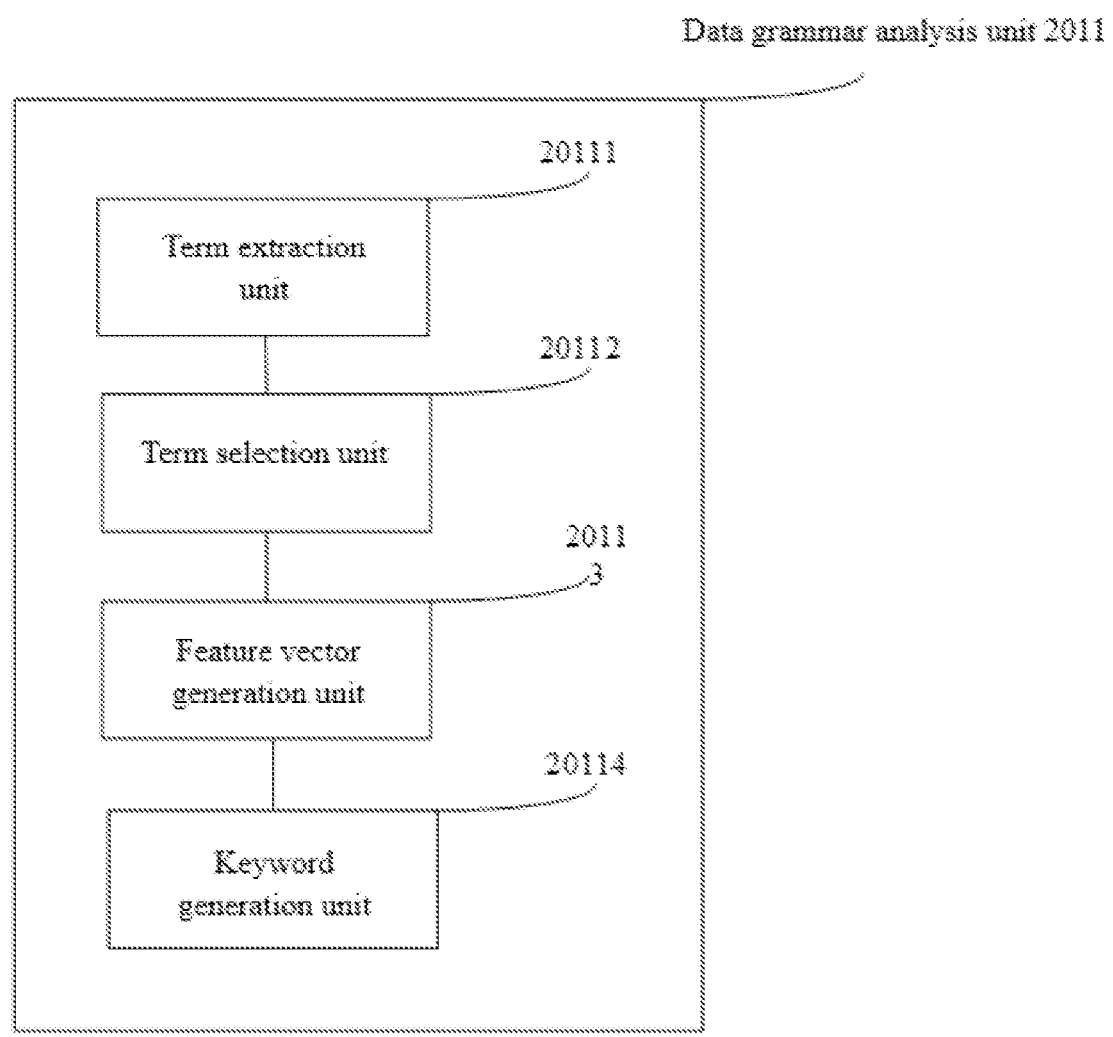
FIG. 14 is a structural schematic diagram of a data grammar analysis unit 2011 in an embodiment of the present invention.

In one embodiment, with reference to FIG. 14, the data grammar analysis unit 2011 comprises:

a term extraction unit 20111, which is used for carrying out term extraction on the structured data according to the term dictionary of the well site test;

a term selection unit 20112, which is used for selecting the terms, the number of appearing frequencies of which is more than the preset number of times, from the extraction results;

a feature vector generation unit 20113, which is used for generating the feature vectors of the structured data according to the terms, the number of appearing frequencies of which is more than the preset number of times; and a keyword generation unit 20114, which is used for generating the keywords of the structured data according to the feature vectors.

Figure 15:
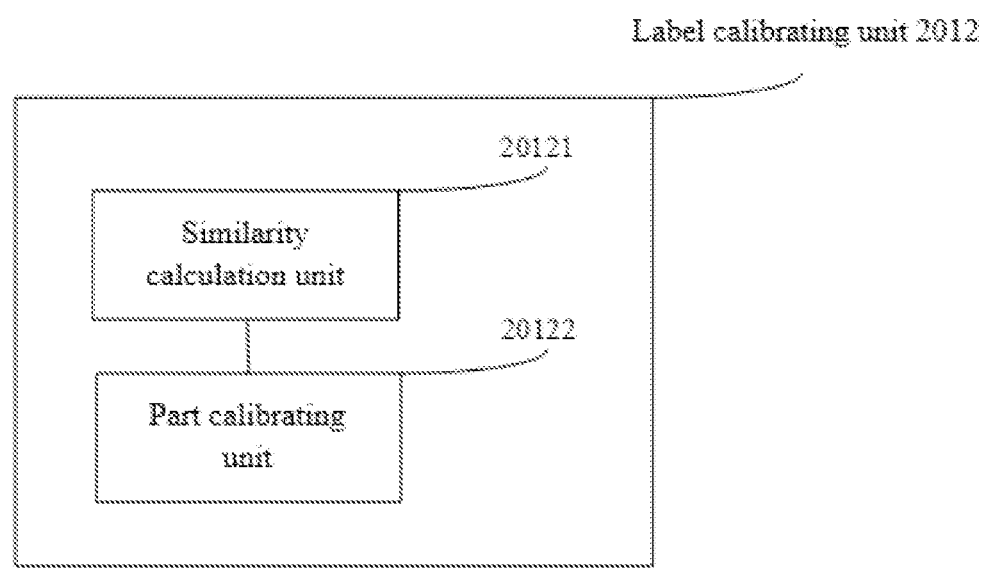
FIG. 15 is a structural schematic diagram of a label calibrating unit 2012 in an embodiment of the present invention.

In one embodiment, with reference to FIG. 15, the label calibrating unit 2012 comprises:

a similarity calculation unit 20121, which is used for calculating the literal text similarities of the semi-structured data/the unstructured data and the term dictionary of the well site test; and a part calibrating unit 20122, which is used for selecting part of data from the semi-structured data and the unstructured data and calibrating the part of data according to the literal text similarities.

Figure 16:
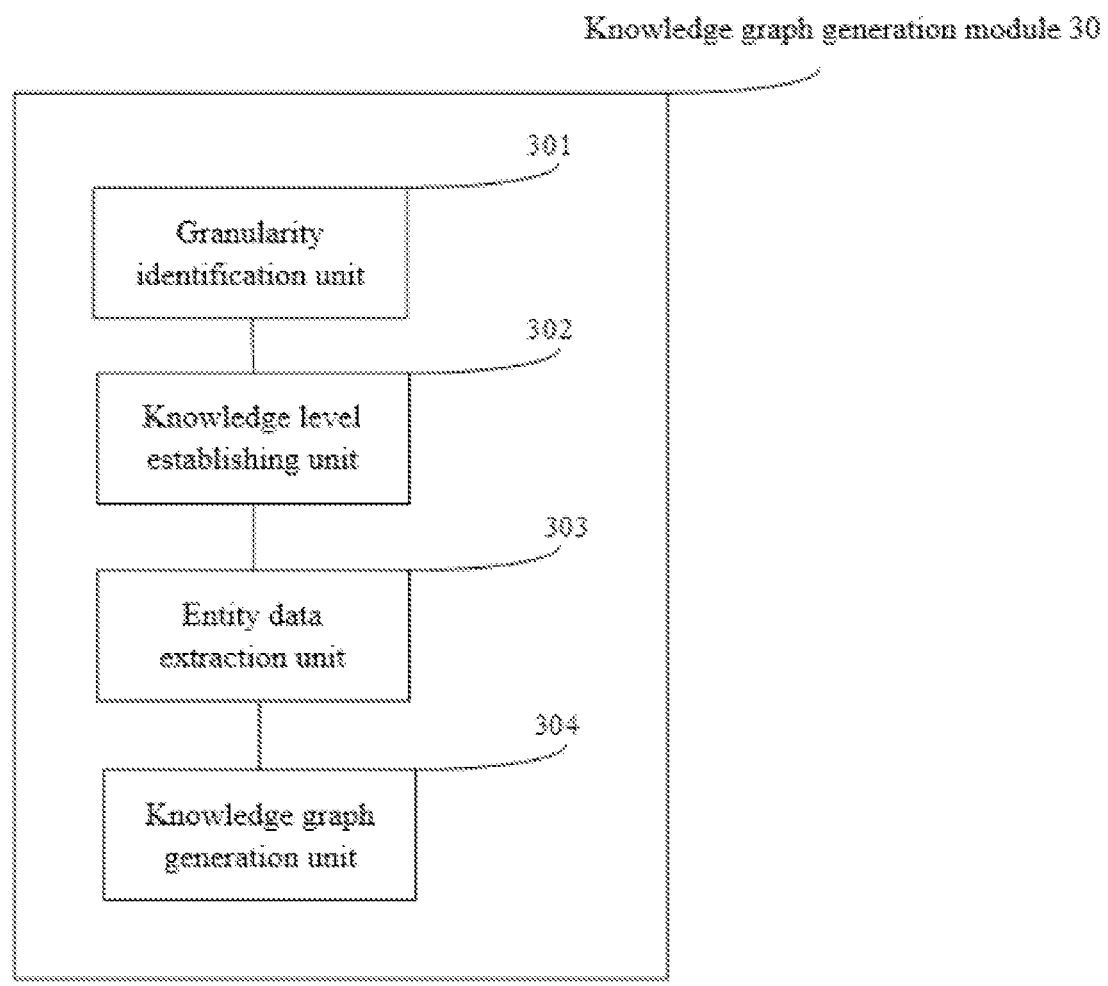
FIG. 16 is a structural schematic diagram of a knowledge graph generation module 30 in an embodiment of the present invention.

In one embodiment, with reference to FIG. 16, the knowledge graph generation module 30 comprises:

a granularity identification unit 301, which is used for carrying out granularity entity identification on the format identification results according to the mind map, so as to generate the identification results;

a knowledge level establishing unit 302, which is used for establishing the knowledge level of the data of the well site test according to the identification results;

an entity data extraction unit 303, which is used for extracting the entity data of the data of the well site test according to the identification results; and a knowledge graph generation unit 304, which is used for generating the knowledge graph according to the knowledge level and the entity data.

It can be known from the above description that the processing device for the data of the well site test based on the knowledge graph, which is provided by the embodiment of the present invention comprises: firstly, carrying out format identification on the received historical data of the well site test to generate the format identification results; establishing the mind map according to the format identification results; then, generating the knowledge graph of the data of the well site test according to the mind map; and finally, processing the historical data of the well site test and the new data of the well site test according to the knowledge graph. According to the processing method and device for the data of the well site test based on the knowledge graph, which are provided by the present invention, the functions of storage, management, sharing, querying, concentrated display and so on of the data in the whole process of the well site test can be realized, the relationship between the data is established, and the data querying efficiency is improved, so as to provide the support for tackling the problems in the technology.

The device, the models or the units illustrated in the above embodiments can be specifically realized by a computer chip or an entity or realized a product with a certain function. Typical realization equipment is electronic equipment. Specifically, for example, the electronic equipment may be a personal computer, a laptop computer, a cell phone, a camera phone, a smart phone, a PDA (Personal Digital Assistant), a media player, navigation equipment, E-mail equipment, a game console, a tablet computer, wearable equipment or a combination of any equipment in all the equipment.

In a typical example, the electronic equipment specifically comprises a memory, a processor and a computer program which is stored in the memory and can operate in the processor; and the processor is configured to execute the program to realize the steps of the processing method for the data of the well site test based on the knowledge graph. The steps comprise:

Step 100: carrying out format identification on the received historical data of the well site test to generate the format identification results;

Step 200: establishing the mind map according to the format identification results;

Step 300: generating the knowledge graph of the data of the well site test according to the mind map; and Step 400: processing the historical data of the well site test and the new data of the well site test according to the knowledge graph.

Hereinafter, with reference to FIG. 17, a structural schematic diagram of electronic equipment 600 suitable for realizing the embodiments of the present application is shown.

Figure 17:
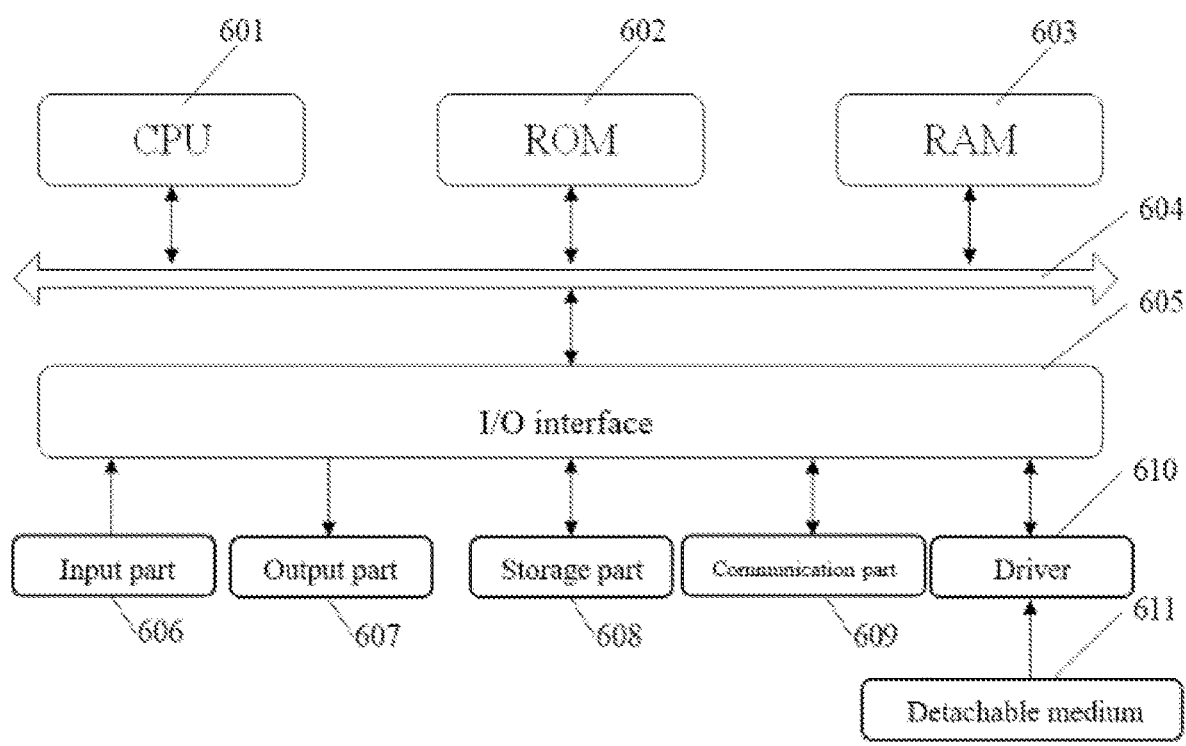
FIG. 17 is a structural schematic diagram of electronic equipment in an embodiment of the present invention.

As shown in FIG. 17, the electronic equipment 600 comprises a CPU (Central Processing Unit) 601 which can be used for executing various types of appropriate work and processing according to a program stored in an ROM (Read Only Memory) 602 or a program loaded into an RAM (Random Access Memory) 603 from a storage part 608. In the RAM 603, a system 600 is also stored for operating various required programs and various types of required data. The CPU 601, the ROM 602 and the RAM 603 are connected with one another by a bus 604. An I/O (Input/Output) interface 605 is also connected to the bus 604.

The following components are also connected to the I/O interface 605, comprising: an input part 606 which comprises a keyboard, a mouse and the like; an output part 607 which comprises a CRT (Cathode Ray Tube), an LCD (Liquid Crystal Display) and the like as well as a loudspeaker and the like; the storage part 608 which comprises a hard disk and the like; and a communication part 609 which comprises a network interface card such as an LAN (Local Area Network) card, a modulator-demodulator and the like. The communication part 609 is configured to execute communication processing through a network such as an Internet. A driver 610 is also connected to the I/O interface 605 as required. A detachable medium 611, such as a magnetic disk, a compact disk, a magneto-optical disk, a semiconductor memory and the like, is installed on the driver 610 as required, so that a computer program read from the detachable medium 611 is installed at the storage part 608 as required.

Particularly, according to the embodiments of the present invention, the process described by reference flow charts in the above can be realized by a computer software program. For example, an embodiment of the present invention comprises a computer readable storage medium; a computer program is stored in the computer readable storage medium; the computer program is executed by the processor to realize the steps of the processing method for the data of the well site test based on the knowledge graph. The steps comprise:

Step 100: carrying out format identification on the received historical data of the well site test to generate the format identification results;

Step 200: establishing the mind map according to the format identification results;

Step 300: generating the knowledge graph of the data of the well site test according to the mind map; and Step 400: processing the historical data of the well site test and the new data of the well site test according to the knowledge graph.

In such the embodiment, the computer program can be downloaded and installed from the network through the communication part 609, and/or is installed by the detachable medium 611.

What is claimed is:

1. A processing method for data of a well site test based on a knowledge graph, comprising:
    carrying out format identification on received historical data of a well site test, so as to generate format identification results;
    establishing a mind map according to the format identification results;
    generating a knowledge graph of the data of the well site test according to the mind map; and
    processing the historical data of the well site test and new data of the well site test according to the knowledge graph;
    the carrying out format identification on received historical data of the well site test to generate format identification results, comprising:
    receiving and resolving binary streams and attached operation commands of files sent by a user through a network request; extracting information of file names, categories of operation objects and file formats from command parameters; scanning a target directory to determine whether folders corresponding to the extracted file formats exist or not; if a folder corresponding to the extracted file format is determined to be nonexistent, creating a new folder corresponding to the file format and writing a corresponding file under a newly created folder to generate a heterogeneous integrated database;
    the establishing the mind map according to the format identification results, comprising:
    determining keywords of the historical data of the well site test according to the format identification results;
    establishing a data storage bank with a multi-level relationship according to the multiple keywords and a preset term dictionary of the well site test;
    establishing the mind map according to the data storage bank;
    the format identification results comprising: structured data, semi-structured data and unstructured data; the unstructured data comprising: a technical file, a picture/an audio/a video, an instrument and equipment ledger, actual drilling data;
    the determining keywords of the historical data of the well site test according to the format identification results comprising:
    carrying out grammar analysis on the structured data to determine keywords of the structured data;
    calibrating labels of the semi-structured data and the unstructured data to determine keywords of the semi-structured data and the unstructured data;
    the carrying out grammar analysis on the structured data to determine keywords of the structured data, specifically comprising: carrying out term extraction on the structured data according to the term dictionary of the well site test; selecting terms, a number of appearing frequencies of which is more than a preset number of times, from extraction results; generating feature vectors of the structured data according to the terms, the number of appearing frequencies of which is more than the preset number of times; and generating the keywords of the structured data according to the feature vectors;
    the calibrating labels of the semi-structured data and the unstructured data to determine keywords of the semi-structured data and the unstructured data, comprising: calculating literal text similarities of the semi-structured data/the unstructured data and the term dictionary of the well site test; and selecting part of data from the semi-structured data and the unstructured data and calibrating the part of data according to the literal text similarities;

wherein a to-be-matched word B with the highest literal text similarity is selected as a label corresponding to data to be calibrated by the following formula, and the label is determined as the keyword to achieve extraction for the data of the semi-structured/unstructured data;

$$sim = 60 \times \left(\frac{xsword}{ctrlword} + \frac{xsword}{keyword}\right)/2 + 40 \times dp \times \left(\sum \frac{c\_xsword(i)}{ctrlword(i)} + \sum \frac{k\_xsword(i)}{keyword(i)}\right)/2$$

wherein sim represents the literal text similarity; xsword represents the number of same characters contained in a to-be-matched word A and a to-be-matched word B; ctrlword represents the total number of characters contained in the to-be-matched word A; keyword represents the total number of characters contained in the to-be-matched word B; dp represents a position coefficient representing a ratio of the total characters of the to-be-matched word A and the to-be-matched word B;

$$\sum \frac{c\_xsword(i)}{\sum ctrlword(i)}$$

represents the sum of weight of the positions of the same characters contained in the to-be-matched word A and the to-be-matched word B in the to-be-matched word A;

$$\sum \frac{k\_xsword(i)}{\sum keyword(i)}$$

represents the sum of weight of the positions of the same characters contained in the to-be-matched word A and the to-be-matched word B in the to-be-matched word B;

the generating a knowledge graph of the historical data of the well site test according to the mind map specifically comprising: carrying out granularity entity identification on the format identification results according to the mind map to generate identification results; establishing a knowledge level of the historical data of the well site test according to the identification results; extracting entity data of the historical data of the well site test according to the identification results; and generating the knowledge graph according to the knowledge level and the entity data.

2. An electronic equipment, comprising a memory, a processor and a computer program which is stored in the memory and can operate in the processor, wherein the processor is configured to achieve the steps of the processing method for data of a well site test based on a knowledge graph of claim 1 when executing the program.

3. A non-transitory computer readable storage medium, having stored thereon a computer program, wherein the computer program when executed by a processor achieves the steps of the processing method for data of a well site test based on a knowledge graph of claim 1.

4. A processing device for data of a well site test based on a knowledge graph, comprising:

an identification result generation module, used for carrying out format identification on received historical data of the well site test to generate format identification results;

a mind map establishing module, used for establishing a mind map according to the format identification results;

a knowledge graph generation module, used for generating a knowledge graph of the historical data of the well site test according to the mind map; and a data processing module, used for processing the historical data of the well site test and new data of the well site test according to the knowledge graph;

the carrying out format identification on received historical data of the well site test to generate format identification results, comprising:

receiving and resolving binary streams and attached operation commands of files sent by a user through a network request extracting information of file names, categories of operation objects and file formats from command parameters; scanning a target directory to determine whether folders corresponding to the extracted file formats exist or not if a folder corresponding to the extracted file format is determined to be nonexistent, creating a new folder corresponding to the file format and writing a corresponding file under a newly created folder to generate a heterogeneous integrated database;

the mind map establishing module comprising:

a keyword determination unit, used for determining keywords of the historical data of the well site test according to the format identification results;

a data storage bank establishing unit, used for establishing a data storage bank with a multi-level relationship according to the multiple keywords and a preset term dictionary of the well site test; and a mind map establishing unit, used for establishing the mind map according to the data storage bank;

the format identification results comprising: structured data, semi-structured data and unstructured data; the unstructured data comprising: a technical file, a picture/an audio/a video, an instrument and equipment ledger, actual drilling data;

the keyword determination unit comprising:

a data grammar analysis unit, used for carrying out grammar analysis on the structured data to determine keywords of the structured data; and a label calibrating unit, used for calibrating labels of the semi-structured data and the unstructured data to determine keywords of the semi-structured data and the unstructured data;

the data grammar analysis unit being specifically used for:

carrying out term extraction on the structured data according to the term dictionary of the well site test selecting terms, a number of appearing frequencies of which is more than a preset number of times, from extraction results; generating feature vectors of the structured data according to the terms, the number of appearing frequencies of which is more than the preset number of times; and generating the keywords of the structured data according to the feature vectors;

the label calibrating unit being specifically used for:

calculating literal text similarities of the semi-structured data/the unstructured data and the term dictionary of the well site test and selecting part of data from the semi-structured data and the unstructured data and calibrating the part of data according to the literal text similarities;

wherein a to-be-matched word B with the highest literal text similarity is selected as a label corresponding to data to be calibrated by the following formula, and the label is determined as the keyword to achieve extraction for the data of the semi-structured/unstructured data;

$$sim = 60 \times \left( \frac{xsword}{ctrlword} + \frac{xsword}{keyword} \right)/2 + 40 \times dp \times \left( \sum \frac{c\_xsword(i)}{ctrlword(i)} + \sum \frac{k\_xsword(i)}{keyword(i)} \right)/2$$

wherein sim represents the literal text similarity; xsword represents the number of same characters contained in a to-be-matched word A and a to-be-matched word B; ctrlword represents the total number of characters contained in the to-be-matched word A; keyword represents the total number of characters contained in the to-be-matched word B; dp represents a position coefficient representing a ratio of the total characters of the to-be-matched word A and the to-be-matched word B;

$$\sum \frac{c\_xsword(i)}{\sum ctrlword(i)}$$

represents the sum of weight of the positions of the same characters contained in the to-be-matched word A and the to-be-matched word B in the to-be-matched word A;

$$\sum \frac{k\_xsword(i)}{\sum keyword(i)}$$

represents the sum of weight of the positions of the same characters contained in the to-be-matched word A and the to-be-matched word B in the to-be-matched word B;

the knowledge graph generation module being specifically used for:

carrying out granularity entity identification on the format identification results according to the mind map to generate identification results; establishing a knowledge level of the historical data of the well site test according to the identification results; extracting entity data of the historical data of the well site test according to the identification results; and generating the knowledge graph according to the knowledge level and the entity data.

* * * * *